United States Patent
Uhler

(10) Patent No.: US 8,944,346 B2
(45) Date of Patent: Feb. 3, 2015

(54) ROTATABLE FLANGE FOR A WATER MONITOR

(75) Inventor: Adam Uhler, Sterling, OH (US)

(73) Assignee: Akron Brass Company, Wooster, OH (US)

( * ) Notice: Subject to any disclaimer, the term of this patent is extended or adjusted under 35 U.S.C. 154(b) by 71 days.

(21) Appl. No.: 12/971,460

(22) Filed: Dec. 17, 2010

(65) Prior Publication Data
US 2011/0162718 A1     Jul. 7, 2011

Related U.S. Application Data

(60) Provisional application No. 61/292,010, filed on Jan. 4, 2010.

(51) Int. Cl.
*B05B 3/16* (2006.01)
*A62C 31/02* (2006.01)
(Continued)

(52) U.S. Cl.
CPC . *A62C 31/02* (2013.01); *F03B 1/00* (2013.01); *F03B 13/00* (2013.01); *F05B 2220/20* (2013.01); *F05B 2260/506* (2013.01); *Y02E 10/223* (2013.01)
USPC .............. 239/242; 239/237; 239/240; 169/52

(58) Field of Classification Search
CPC .......................... F05B 2260/506; Y02E 10/223
USPC ............. 239/225.1–265; 169/52; 285/95, 282
See application file for complete search history.

(56) References Cited

U.S. PATENT DOCUMENTS

| | | |
|---|---|---|
| 3,612,408 A | 10/1971 | Holleman |
| 4,392,618 A | 7/1983 | Evans et al. |
| 4,506,738 A | 3/1985 | Evans et al. |

(Continued)

FOREIGN PATENT DOCUMENTS

| | | |
|---|---|---|
| DE | 1425515 | 12/1969 |
| DE | 1952689 | 5/1971 |

(Continued)

OTHER PUBLICATIONS

Stang Industrial Products: Oscill., water DRV., 4.0" NOM, Part No. (105425-91), Drawing Date Jun. 27, 2002., http://web.archive.org/web/20060501085616/http://www.stangindustrial.com/site/pages/pro06.html, Published Date: May 1, 2006.*

(Continued)

*Primary Examiner* — Jason Boeckmann
*Assistant Examiner* — Joel Zhou
(74) *Attorney, Agent, or Firm* — Brouse McDowell; Michael G. Craig

(57) ABSTRACT

A rotatable apparatus for a water monitor. A flange assembly has a stationary portion, a rotatable portion disposed in the stationary portion, and a duct extending through the stationary and rotatable portions. A water-driven turbine has a rotatable water wheel in communication with the duct and an output shaft coupled to the water wheel. Fluid flowing through the duct causes the water wheel to rotate, the rotation of the water wheel causing the output shaft to rotate. An output crank, a first linkage, a rocker arm, and a second linkage comprising a first linkage member and a second linkage member are operable by the output shaft to convert the rotating motion of the output shaft to an oscillatory motion. Fluid exiting the duct is distributed by the rotatable portion in a determinable oscillatory pattern.

23 Claims, 20 Drawing Sheets

(51) Int. Cl.
F03B 1/00 (2006.01)
F03B 13/00 (2006.01)

(56) References Cited

U.S. PATENT DOCUMENTS

| | | | |
|---|---|---|---|
| 4,679,732 | A | 7/1987 | Woodward |
| 4,697,742 | A | 10/1987 | Schnipke |
| 4,793,557 | A | 12/1988 | Marchese et al. |
| 5,425,505 | A | 6/1995 | Jones |
| 5,848,444 | A | 12/1998 | Christopherson |
| 5,997,047 | A | 12/1999 | Pimentel et al. |
| 6,439,478 | B1 * | 8/2002 | King et al. ............ 239/261 |
| 6,655,613 | B1 | 12/2003 | Brown |
| 7,066,411 | B2 | 6/2006 | Male et al. |
| 7,137,578 | B2 | 11/2006 | Steingass et al. |
| 7,337,808 | B2 | 3/2008 | Shamir et al. |
| RE40,441 | E | 7/2008 | Kolacz et al. |
| 7,644,777 | B2 | 1/2010 | Combs et al. |
| 2003/0077110 | A1 | 4/2003 | Knowles |
| 2006/0231648 | A1 | 10/2006 | Male et al. |
| 2009/0000795 | A1 | 1/2009 | Combs et al. |
| 2009/0107687 | A1 | 4/2009 | Combs et al. |
| 2009/0226243 | A1 | 9/2009 | Krywitsky |
| 2009/0277656 | A1 | 11/2009 | Combs |
| 2012/0126029 | A1 * | 5/2012 | Koetsier ............ 239/242 |

FOREIGN PATENT DOCUMENTS

| | | |
|---|---|---|
| DE | 29600355 U1 | 6/1997 |
| GB | 485161 | 5/1938 |
| JP | 2007021988 A | 2/2007 |

OTHER PUBLICATIONS

Mekanizmalar http://web.archive.org/web/20071221225632/http://www.mekanizmalar.com/fourbar01.shtml, Published Date: Dec. 21, 2007.*
Stang Industrial Products: Oscill., water DRV., 4.0" NOM, Part No. (105425-91), Drawing Date Jun. 27, 2002., U http://web.archive.~rg/web/2~~6~5~1085616/http://www.stangindustria~.c~m/site/pages/pr~~6.htm~~ Published Date: May 1, 2006.*
Mekanizmalar http://web.archive.~rg/web/2~~71221225632/http://www.mekanizma~ar.c~m/f~urbar~1.shtm~~ Published Date:Dec. 21, 2007.*
Akron Brass, Severe Duty Monitor, Wooster, Ohio.
Chemguard Specialty Chemicals & Equipment, Water Powered Oscillating Mechanism, Sep. 2005, 2 Pages, Mansfield, Texas.
PDF, photograph depicting a backhoe linkage.
Patent Cooperation Treaty International Search Report, PCT Application No. PCT/US2013/046757, Mailed Sep. 20, 2013.
StreamMaster Electric Monitor Style 3578 product sheet, Akron Brass Company, www.akronbrass.com, Feb. 2012.
Renegade Electric Monitor style 3580 product cut sheets, Akron Brass Company, www.akronbrass.com, Feb. 2012.

* cited by examiner

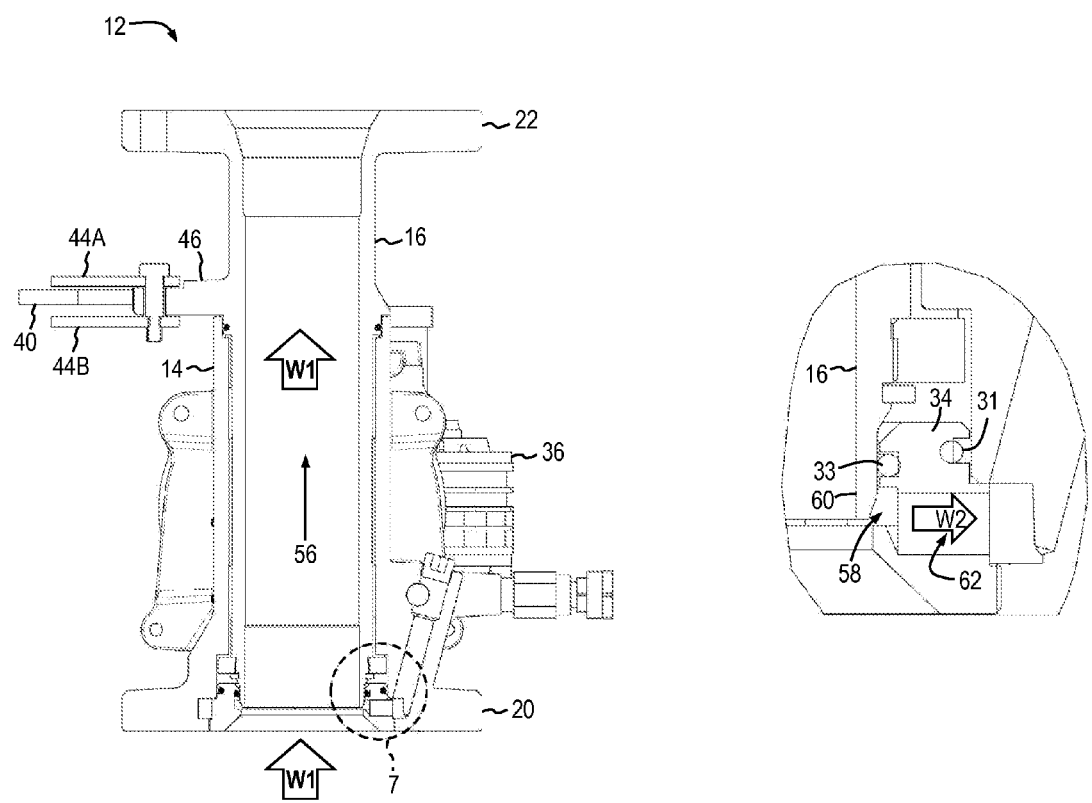
*Fig. 6*     *Fig. 7*

US 8,944,346 B2

ROTATABLE FLANGE FOR A WATER MONITOR

This application claims priority to U.S. provisional patent application No. 61/292,010, filed Jan. 4, 2010, the contents of which are hereby incorporated by reference.

FIELD

The present invention relates generally to equipment for directing fluids, in particular to water monitors used to direct water at hazards such as fires.

BACKGROUND

Water turrets or "monitors" are used to manually or automatically distribute high-pressure streams of foam, water or water-based foam over an area determined by the angle of elevation of the monitor, its arc of oscillation, its speed of oscillation and its pattern of oscillation. Monitors are primarily used to extinguish fire hazards, although other uses may include fire prevention, irrigation, crowd control, and water-cooling of objects.

Monitors are often configured as rotatable or oscillating types having a fixed input portion and a rotatable output portion. A water-driven turbine in the fixed portion is used to convert water flowing through the monitor to rotary mechanical motive power. The mechanical motive power is coupled to a rotary-to-oscillatory motion converter which is in turn coupled between the fixed and rotatable portions of the monitor, causing the rotatable portion to move in a predetermined or determinable pattern defined by the characteristics of the motion converter.

Oscillating monitors typically include a rotatable flange having ball bearings between the fixed portion and the rotatable portion to reduce rotational friction between these components and to support radial and axial loads exerted upon the rotatable portion. A pair of races are utilized to contain a plurality of balls and to transmit the loads through the balls, one race being formed in the fixed portion and a facially adjacent race being formed in the rotatable portion. As the race in the rotatable portion moves it causes the balls to rotate as well. Because the balls are rolling they have a lower coefficient of friction than if two flat surfaces were rotating upon each other.

A significant drawback of the ball bearing arrangement in a rotatable flange is that the balls are typically fabricated of much harder material than the portions of the flange containing the races. For example, the balls are typically made of steel while the races are made of brass. This results in rapid wear of the races and subsequent loss in the integrity of fit between the rotatable and fixed portions of the rotatable flange. Furthermore, because of physical limitations of the rotatable flange arrangement the ball bearings must be installed into the races after the rotatable and fixed portions are joined together. Consequently, a fill port must be provided to either or both the fixed and the rotatable portions of the monitor to facilitate installing the balls in the races, complicating the tooling used to fabricate the monitor. Furthermore, a closure such as a cap or cover must also be provided to close off the port once the balls are installed. In addition, the installation of the balls into the races is laborious and time-consuming. It is therefore desirable to reduce the labor associated with the ball bearing assembly and increase reliability.

An additional limitation of present monitors is that the sweep range of their pattern of oscillation is generally limited to about 120 degrees. This range is often insufficient, requiring that the monitor be moved or repositioned periodically in order to obtain the desired coverage.

A further limitation of present monitors is that the rotary-to-oscillatory conversion mechanism is not sufficiently robust. Consequentially, the mechanism is subject to deformation—often further limiting the sweep range of the monitor—or failure altogether, rendering the monitor unusable for its intended purpose.

There is a need for a monitor having an improved bearing system. There is further need for a monitor having a wider sweep range and a robust rotary-to-oscillatory conversion mechanism.

SUMMARY

A rotatable flange for a water monitor is disclosed according to an embodiment of the present invention. One or more one-piece bearings made of a durable low-friction material are disposed between a stationary portion and a rotatable portion of the rotatable flange, thus eliminating much of the wear and the costs associated with ball bearings.

Also disclosed is a rotary-to-oscillatory motion converter having a pair of linkages and a rocker arm. The motion converter is arranged to deter high bending loads imposed upon the linkages and rocker arm, and also provides a wide angle of oscillation.

In one embodiment of the present invention a rotatable apparatus for a water monitor comprises a flange assembly having a stationary portion, a rotatable portion disposed in the stationary portion, and a duct extending through the stationary and rotatable portions, the duct being adapted to convey fluid flowing therethrough, the fluid entering the duct through the stationary portion and exiting the duct through the rotatable portion. A water-driven turbine has a water jet passage, a rotatable water wheel and a rotatable output shaft coupled to the water wheel, the water jet passage being in communication with the duct and receiving a drive portion of the flowing fluid, the drive portion being directed at the water wheel and causing the water wheel to rotate, the rotation of the water wheel causing the output shaft to rotate. An output crank is coupled to the output shaft. A first linkage has a first end and a second, opposing end, the first end being rotatably coupled to the output crank. A rocker arm has a first end and a second, opposing end. A second linkage comprises a first linkage member and a second linkage member, the linkage members each having a first and a second opposing end. The second end of the first linkage is rotatably coupled to both the first end of the rocker arm and the first ends of the linkage members, the second end of the rocker arm being rotatably attached to the stationary portion, the second ends of the linkage members being rotatably coupled to the rotatable portion. The fluid exiting the duct is distributed by the rotatable portion in a determinable oscillatory pattern.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 6 through 13 show details of a water-driven turbine according to an embodiment of the present invention.

DETAILED DESCRIPTION

Figure 1A:
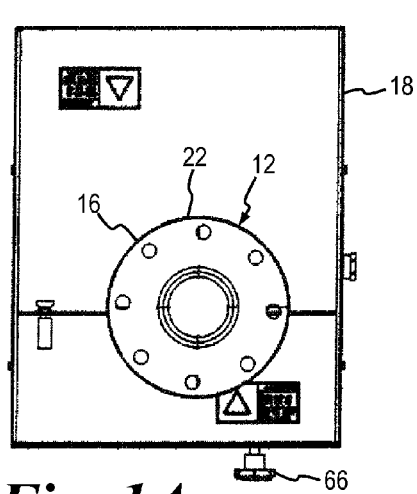
FIG. 1A is a top plan view of a rotatable apparatus for a water monitor according to an embodiment of the present invention.
Figure 1B:
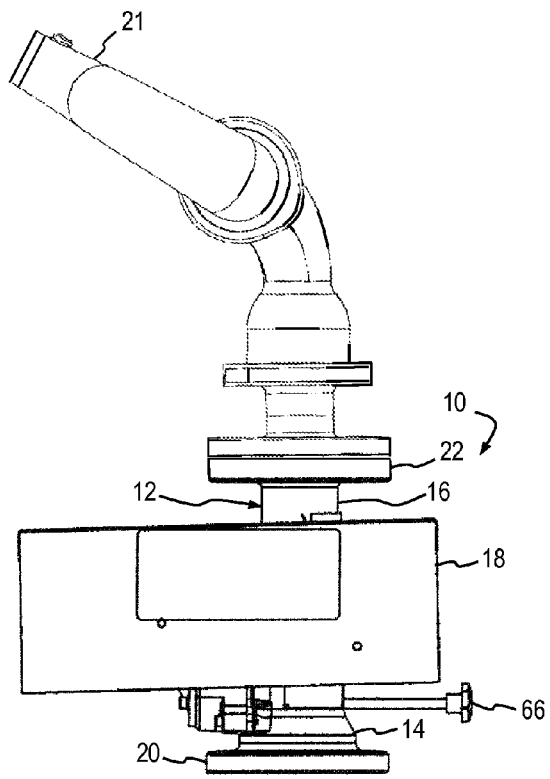
FIG. 1B is a left-side elevational view of the apparatus of FIG. 1A.
Figure 1C:
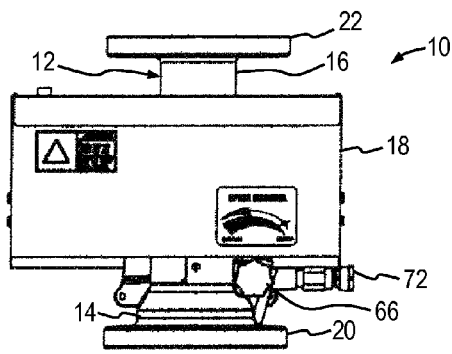
FIG. 1C is an end elevational view of the apparatus of FIG. 1A.
Figure 1D:
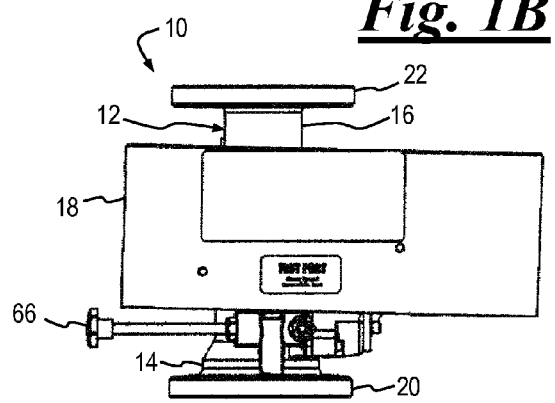
FIG. 1D is a right-side elevational view of the apparatus of FIG. 1A.

A rotatable apparatus 10 for a water monitor is shown in Figs. 1A through 3 according to an embodiment of the present invention. Apparatus 10 includes a rotatable flange assembly 12 having a stationary portion 14 and a rotatable portion 16. A housing 18 intermediate stationary portion 14 and rotatable portion 16 houses a water drive turbine and a rotary-to-oscillatory motion converter, detailed below.

Figure 2:
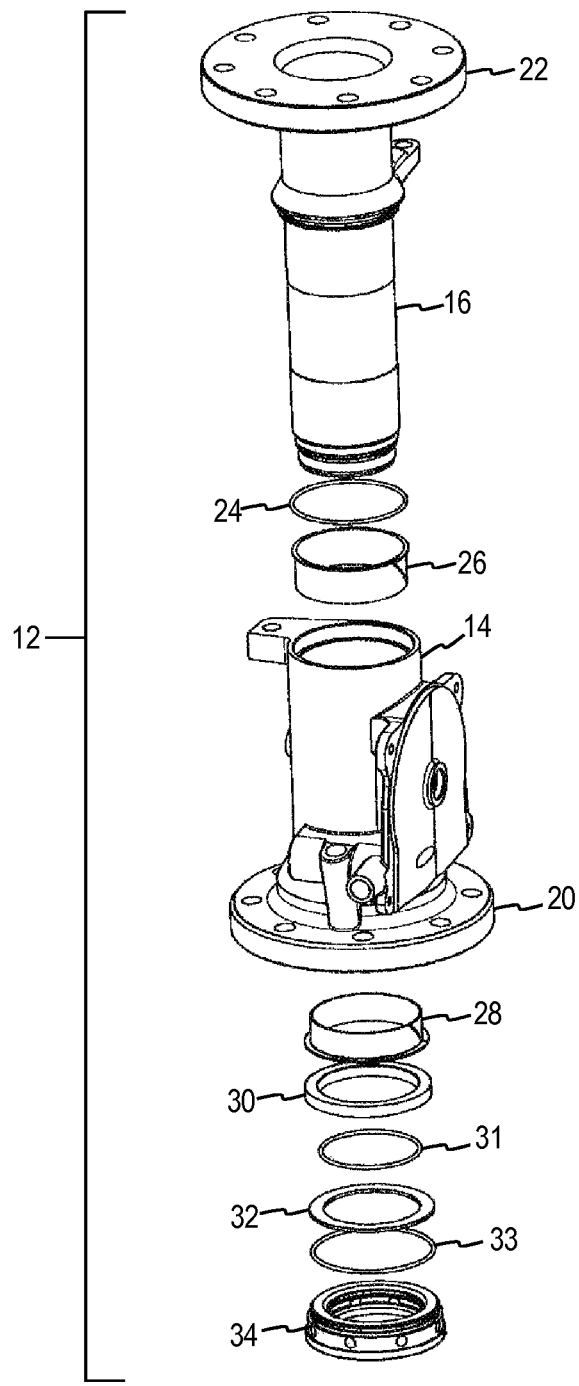
FIG. 2 is an exploded view of a rotatable flange assembly according to an embodiment of the present invention.
Figure 3:
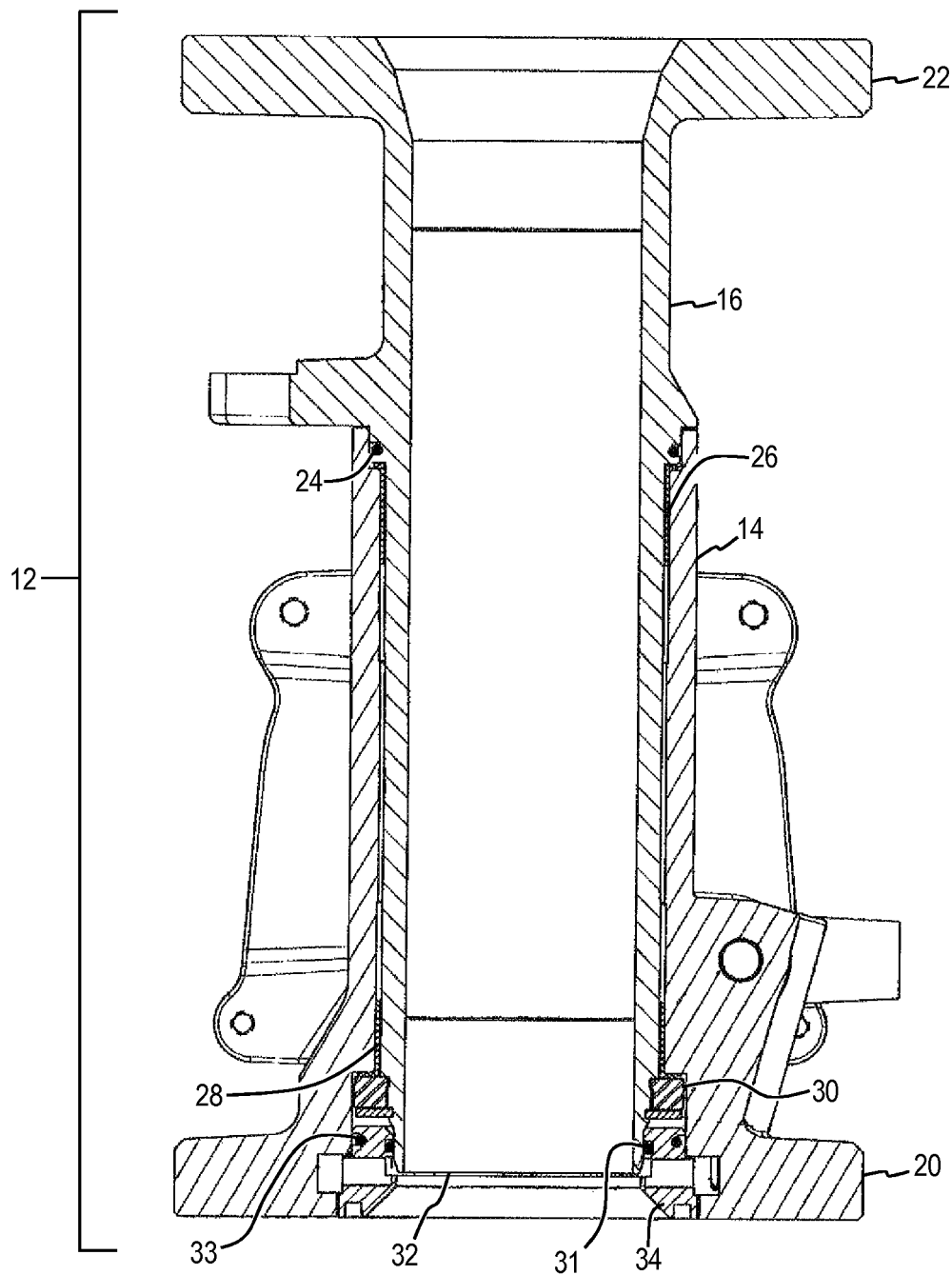
FIG. 3 is a view in section of the rotatable flange assembly of FIG. 2 in an assembled condition.

Further details of rotatable flange assembly 12 are shown in FIGS. 2 and 3. Stationary portion 14 includes a mounting ring 20 to facilitate attachment of apparatus 10 to a stable and secure mounting surface and a water supply source. Similarly, rotatable portion 16 includes an output flange 22 to facilitate attachment of devices such as monitors having nozzles 21 (FIG. 1 B) and the like to direct water flowing through the apparatus 10.

Rotatable portion 16 is assembled with an 0-ring seal 24 for dust protection and further includes a first bearing 26. Rotatable portion 16 is inserted into stationary portion 14, as shown in FIG. 2. A second bearing 28 is the inserted through a bottom opening of stationary portion 14 and onto rotatable portion 16. A ring 30 is also coupled to rotatable portion 16, to capture second bearing 28 between stationary portion 14 and the ring. Ring 30 is preferably rigidly attached to rotatable portion 16. In one embodiment ring 30 is attached to rotatable portion 16 with mating threads on both the rotatable portion and the ring. A snap ring 32 may optionally be coupled to rotatable portion 16 to deter ring 30 from unthreading. Rotatable flange assembly 12 may also include additional O-rings 31, 33 in stationary portion 14. A cylindrically-shaped plug 34 is then assembled to stationary portion 14. Plug 34 functions to filter contaminates from a water jet stream input to stationary portion 14, and also allows water to pass into a water-driven turbine (discussed further below) to power the turbine. Plug 34 also provides a flush sealing surface with the bottom of stationary portion 14 as rotatable flange assembly 12 is mounted to a secure mounting surface such as a flanged riser (not shown).

As can be seen in FIG. 3, bearings 26, 28 are situated intermediate stationary portion 14 and rotatable portion 16. Bearings 26, 28 reduce rotational friction between the stationary and rotatable portions and also provide support to rotatable portion 16 to better withstand radial and axial loads applied to output flange 22. Bearings 26, 28 are each preferably made as a unitary, hollow piece having a circular sidewall, open ends, and a retaining lip at one end as shown in FIGS. 2 and 3. Alternatively, bearings 26, 28 may be made from separate components and joined together to form an assembly.

Bearings 26, 28 are preferably made of a durable low-friction material such as a polymer plastic, including but not limited to PTFE fluoropolymer, acetal, polyester and polyamide. In one embodiment bearings 26, 28 are made from ultra high molecular weight polyethylene (UHMW-PE) material. Bearings 26, 28 provide superior performance and durability in comparison to ball bearings installed in brass races. This is because ball bearing designs create high localized stresses due to point contacts generated between balls in the bearings and adjacent brass races. The localized stresses cause the relatively soft brass material to yield and deform, increasing friction and reducing the life of the bearing. In contrast, bearings 26, 28 of the present invention have a low friction coefficient which improves performance and increases durability in comparison to ball bearings. As can be seen in FIG. 3, bearings 26, 28 each have a surface contact with stationary portion 14 and rotatable portion 16 as opposed to the point contact commonly found in prior ball races through deformation.

Figure 4:
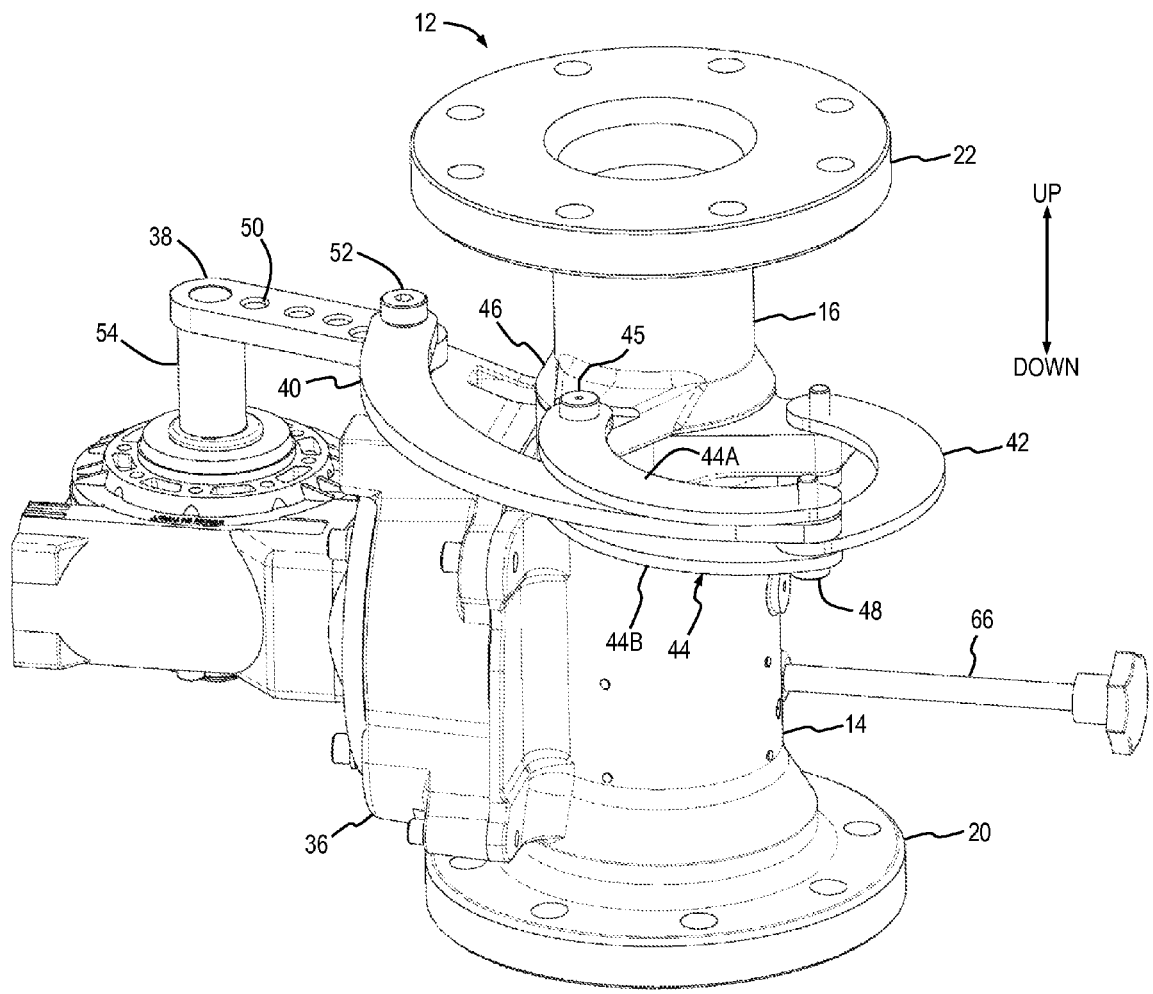
FIG. 4 shows the general arrangement of the components of the rotatable flange assembly of FIGS. 2 and 3.

Still further details of rotatable flange assembly 12 are shown in FIG. 4, wherein a water-driven turbine 36 is coupled to stationary portion 14. Turbine 36 includes a rotatable output crank 38 rotatably coupled to a first end of a first linkage 40. A second, opposing end of first linkage 40 is in turn rotatably coupled to both a first end of a rocker arm 42 and a first end of a second linkage 44, comprising a pair of linkage members 44A and 44B. A second, opposing end of rocker arm 42 is rotatably attached to stationary portion 14. A second, opposing end of second linkage 44 (i.e., linkage members 44A, 44B) is rotatably coupled at a fastener 45 to a tab 46 of rotatable portion 16.

With continued reference to FIG. 4, it can be seen that the first ends of linkage members 44A and 44B are coupled to first linkage 40 and to rocker arm 42, linkage member 44A being facially adjacent an upper surface of the first linkage and linkage member 44B being facially adjacent a lower surface of the rocker arm. Likewise, it can be seen that the second ends of linkage members 44A and 44B are coupled to tab 46 of rotatable portion 16, linkage member 44A being facially adjacent an upper surface of the tab and linkage member 44B being facially adjacent a lower surface of the tab. This arrangement forms a clevis that balances the forces exerted upon a linking pin 48 that joins together first linkage 40, linkage members 44A, 44B and rocker arm 42, the clevis resisting bending loads imposed on the joint formed by the first linkage, the rocker arm, the linkage members, and the linking pin. 2

Figure 5A:
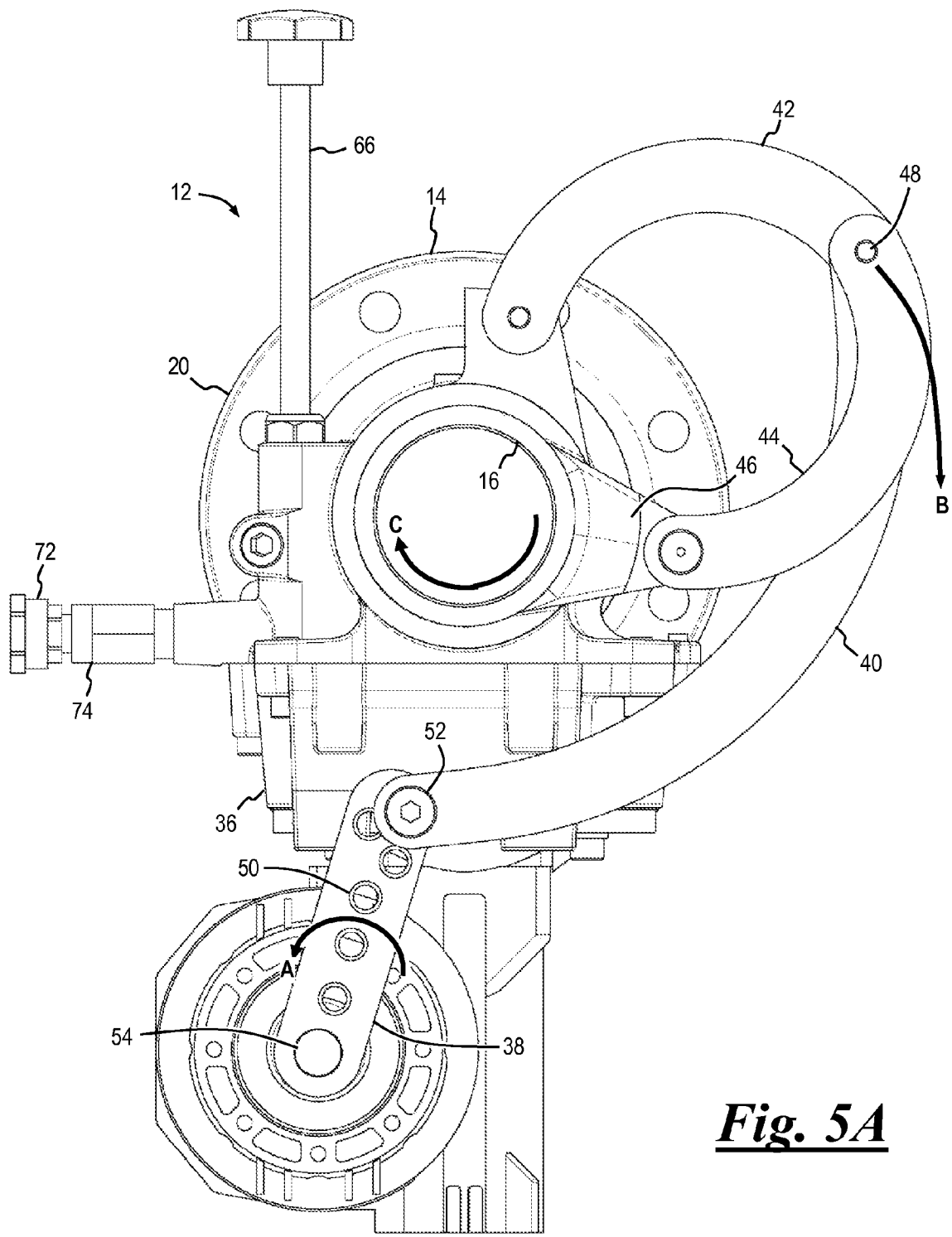
FIGS. 5A through 5I show stages of the movement of the rotatable flange assembly of FIGS. 2-4, an output flange being removed for clarity.
Figure 5B:
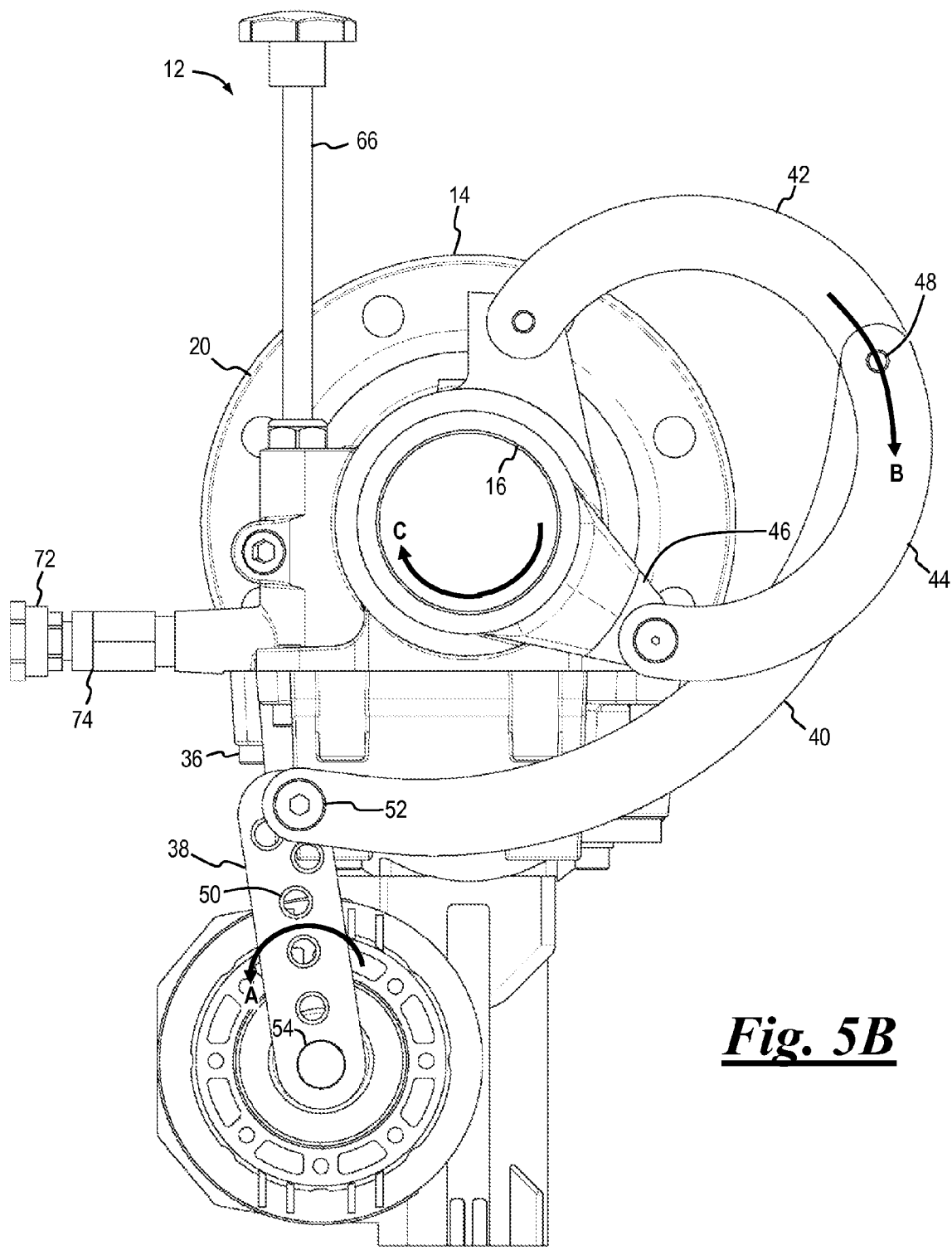
Figure 5C:
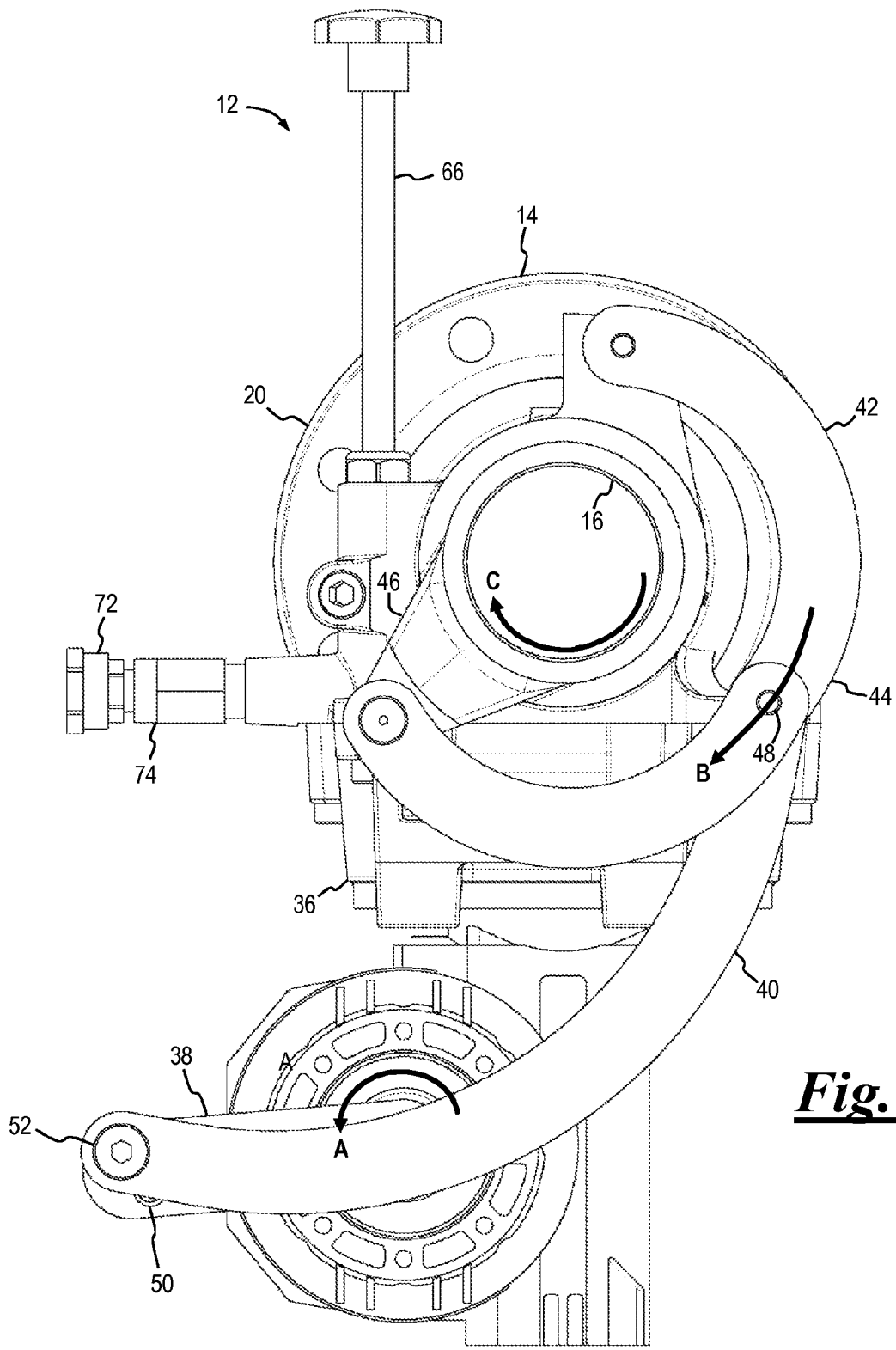
Figure 5D:
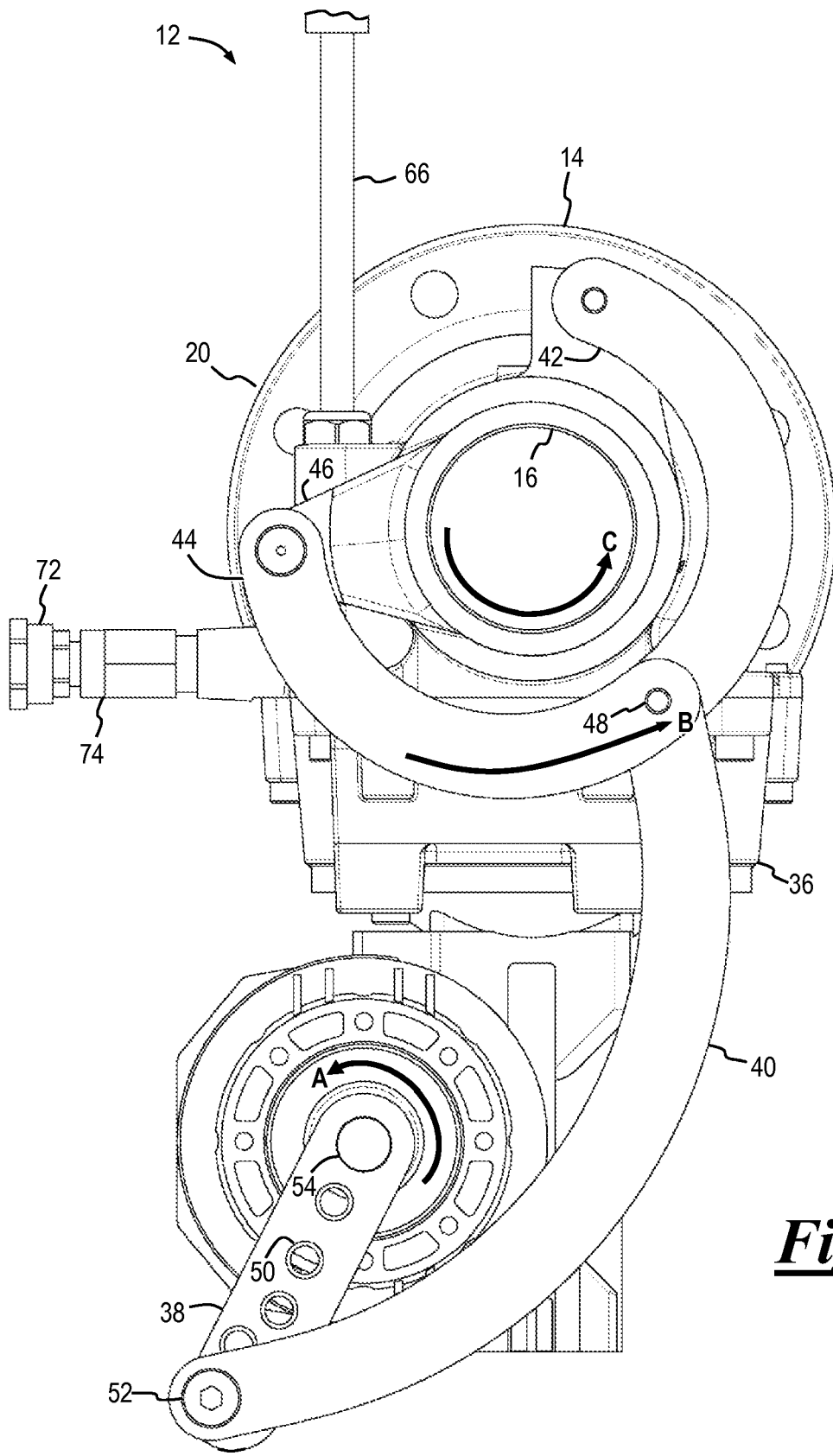
Figure 5E:
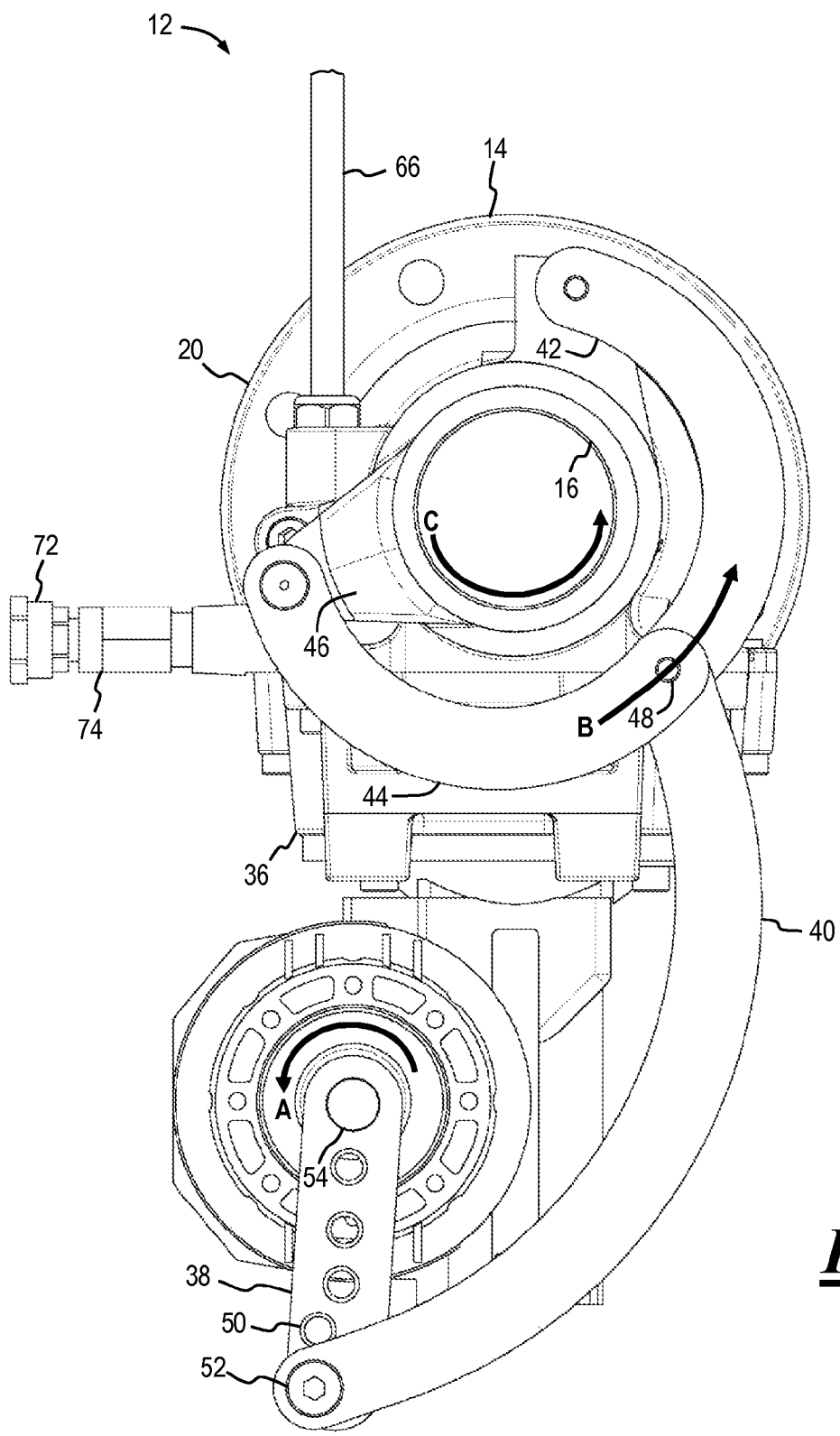
Figure 5F:
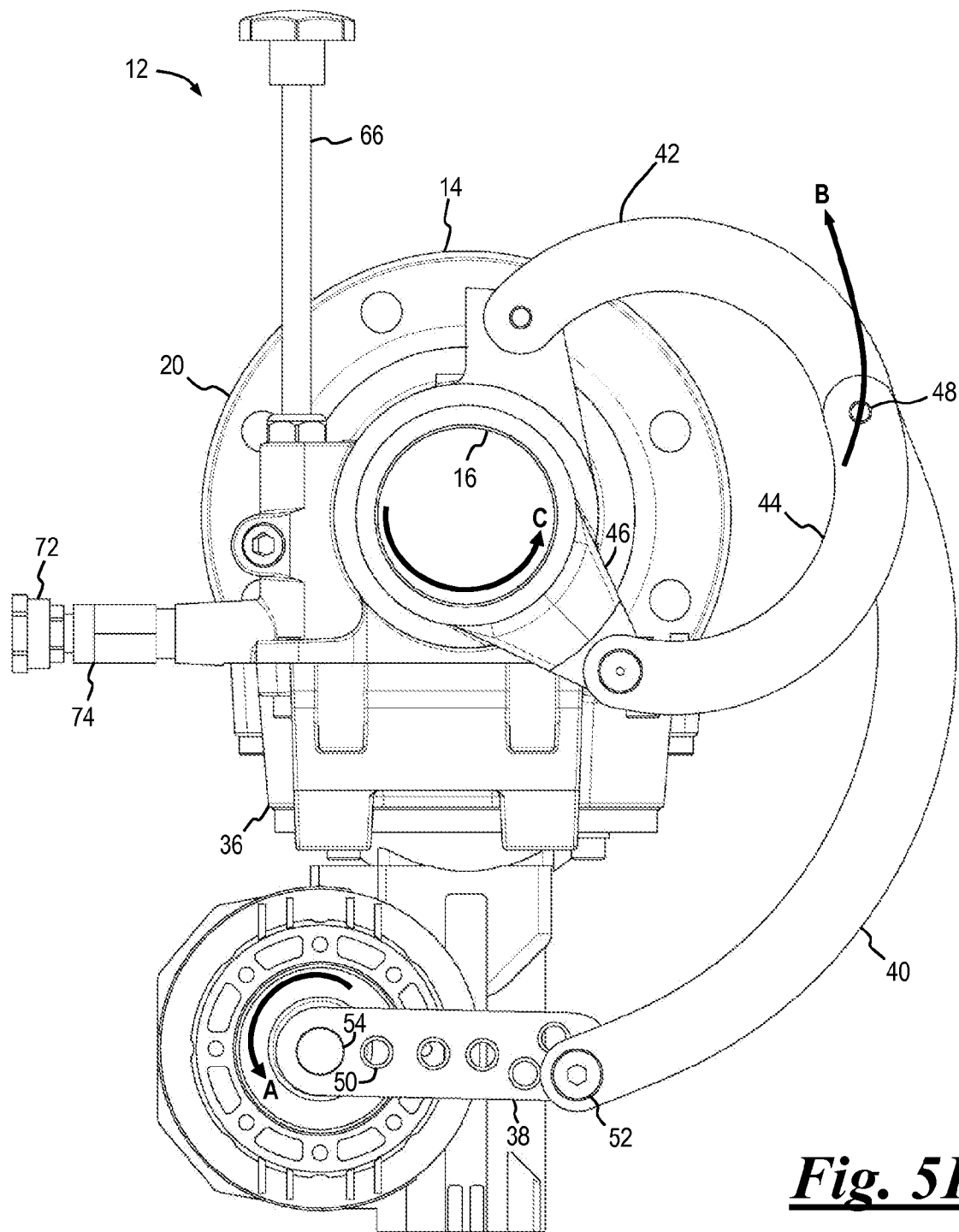
Figure 5G:
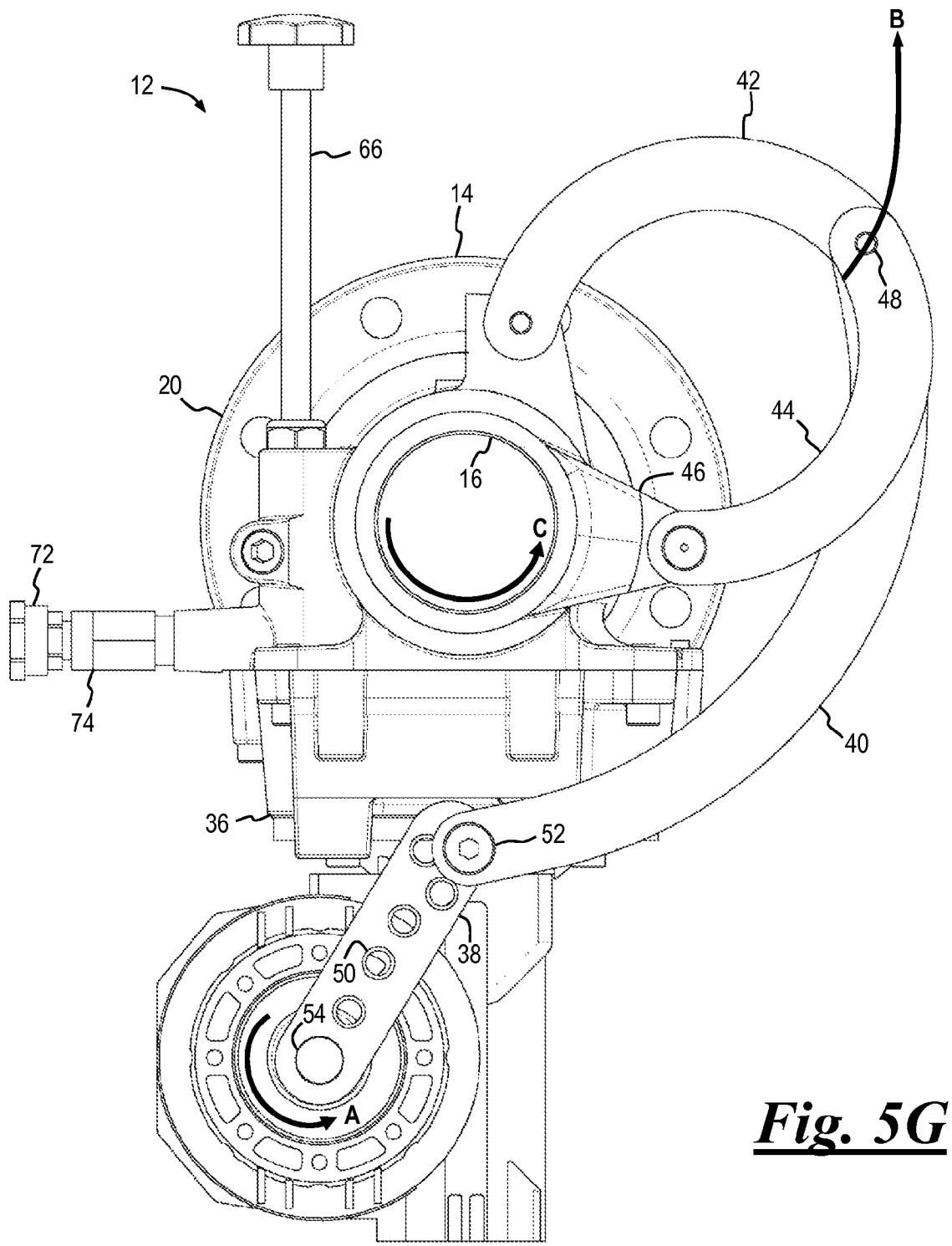
Figure 5H:
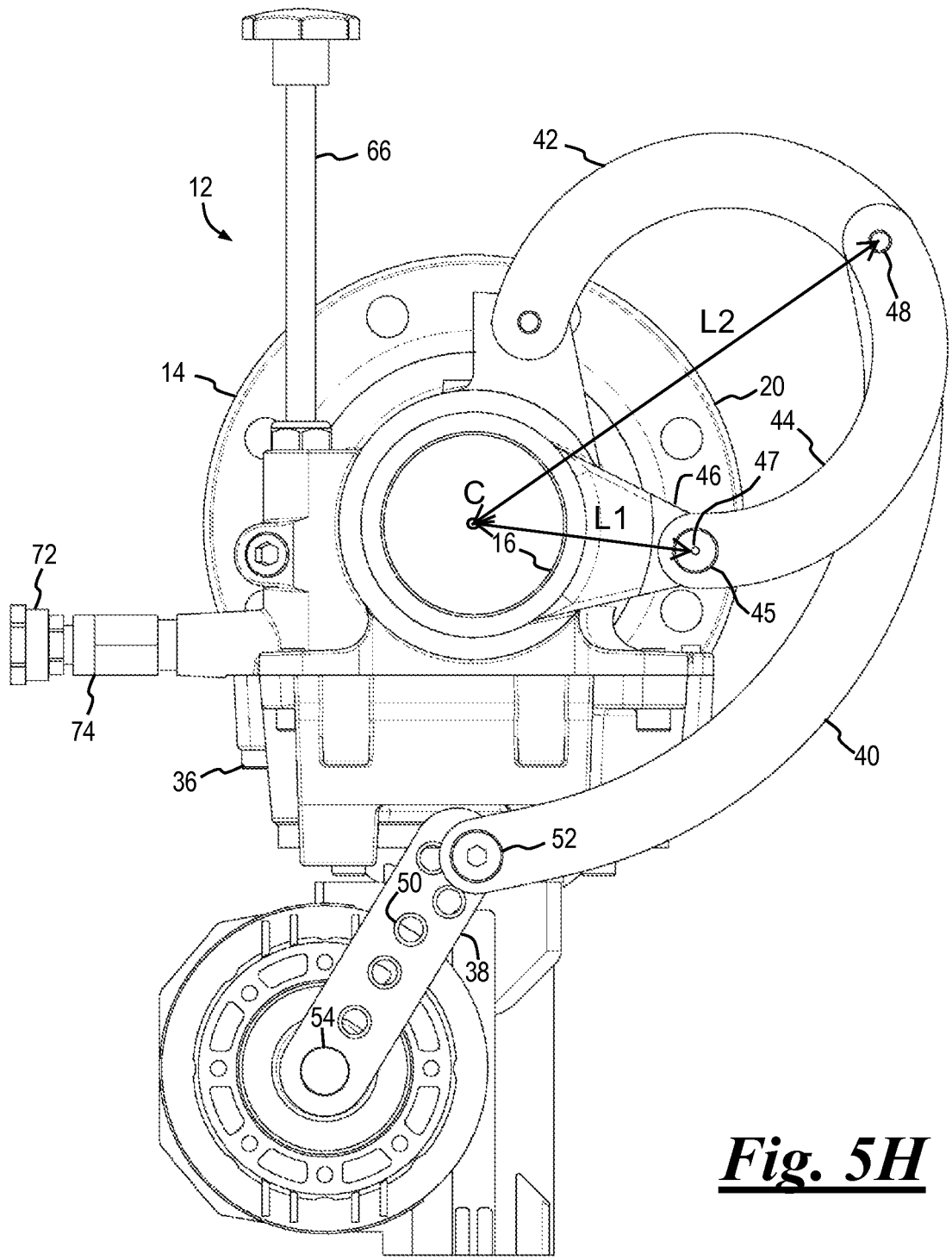
Figure 5I:
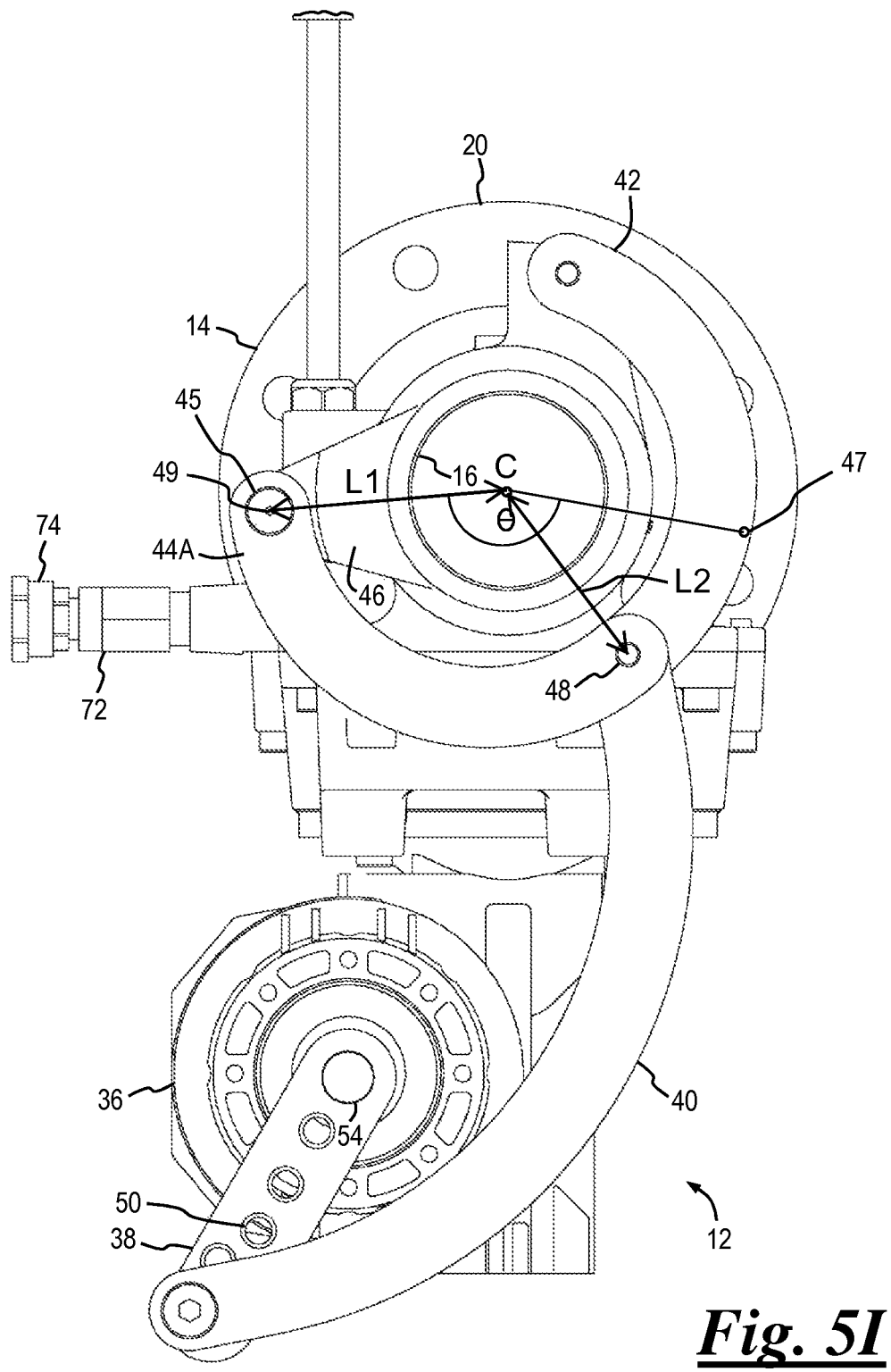

FIGS. 5A through 5I show top plan views of rotatable flange assembly 12 with output flange 22 omitted for clarity. With reference to these figures in combination with FIG. 4, the operation of rotatable flange assembly 12 will now be described. Turbine 36 receives a portion of pressurized water input to stationary portion 14 through a duct 56 (FIG. 6) and converts a pressurized water flow therethrough to rotary mechanical motion, causing crank 38 to continuously rotate through a 360 degree arc, as indicated by arrow "A." The rotation of crank 38 causes first linkage 40, rocker arm 42 and second linkage 44 to move in a predetermined pattern, as indicated by arrows "B." The movement of first linkage 40, rocker arm 42 and second linkage 44 causes rotatable portion 16 to move in an oscillatory pattern, as indicated by arrows C." Mechanically, first linkage 40, rocker arm 42 and second linkage 44 function to couple the mechanical motion of crank 38 to rotatable portion 16, and to convert the rotary motion of crank 38 to oscillatory motion having a determinable sweeping arc pattern. FIGS. 5A through 5G show the positions of crank 38, first linkage 40, rocker arm 42, second linkage 44 and rotatable portion 16 at stages through one complete oscillation cycle of the rotatable portion. FIGS. 5H and 5I show the positions of crank 38, first linkage 40, rocker arm 42, second linkage 44 and rotatable portion 16 at a first and a second opposing end 47, 49, respectively, of an oscillation cycle, where the rotatable portion 16 has a center of rotation "C" along its longitudinal axis. To provide a more compact design of rotatable flange assembly 12 relative to the center of rotation C, either of first linkage 40, rocker arm 42, and second linkage 44 may be configured with a curved shape extending from the first end to the second end thereof. Rotatable flange assembly 12 is configured with a predetermined length L1 from the center of rotation C to the center of fastener 45 along its longitudinal axis. Rotatable flange assembly 12 is further configured such that during the oscillation cycle, there is a varying distance L2 from the center of rotation C to the center of linking pin 48 along its longitudinal axis. During the oscillation cycle, distance L2 varies from a maximum at the first end 47 to a minimum at the second end 49. At the second end 49 of the oscillation cycle, the distance L2 is less than the length L1.

Referring again to FIGS. 4 through 5I, first linkage 40 is coupled to rocker arm 42 and second linkage 44 in the manner described above. This motion converter arrangement is contrasted with prior motion converters wherein rocker arm 42 and second linkage 44 are omitted and first linkage 40 is coupled to tab 46. The arrangement of the present invention allows a greater range of oscillation, to a sweep range angle θ from first sweep end 47 to second sweep end 49 of up to about 165 degrees as compared to a range of about 120 degrees with prior motion converters. The oscillation range of rotatable flange assembly 12 is also adjustable by coupling the first end of first linkage 40 to a select aperture 50 of output crank 38 with a fastener 52. Selecting an aperture 50 closer to an output shaft 54 of turbine 36 results in a smaller oscillation angle of rotatable flange assembly 12, while selecting an aperture farther from the output shaft results in a larger oscillation angle of the rotatable flange assembly.

FIGS. 6 through 12 describe an example water-driven turbine 36 according to one embodiment of the present invention. As shown in FIGS. 6 and 7 in combination, water "W1" flowing through a duct 56 formed by stationary portion 14 and rotatable portion 16 is filtered at a seam 58 delimited by a cylindrically-shaped plug 34 and a cylindrical lower end 60 of rotatable portion 16, the filtered water flow being a turbine drive portion of W1 and labeled "W2" in the figures. Seam 58 is sized to filter particles larger than a predetermined size, and extends around the circumference of plug 56 and lower end 60. Seam 58 is further sized to minimize a drop in pressure of water flowing through the seam. Plug 34 is coupled to stationary portion 14. The area between stationary portion 14 and rotatable portion 16 is isolated with O-ring seals 31, 33, shown in FIGS. 6 and 7.

Figure 8:
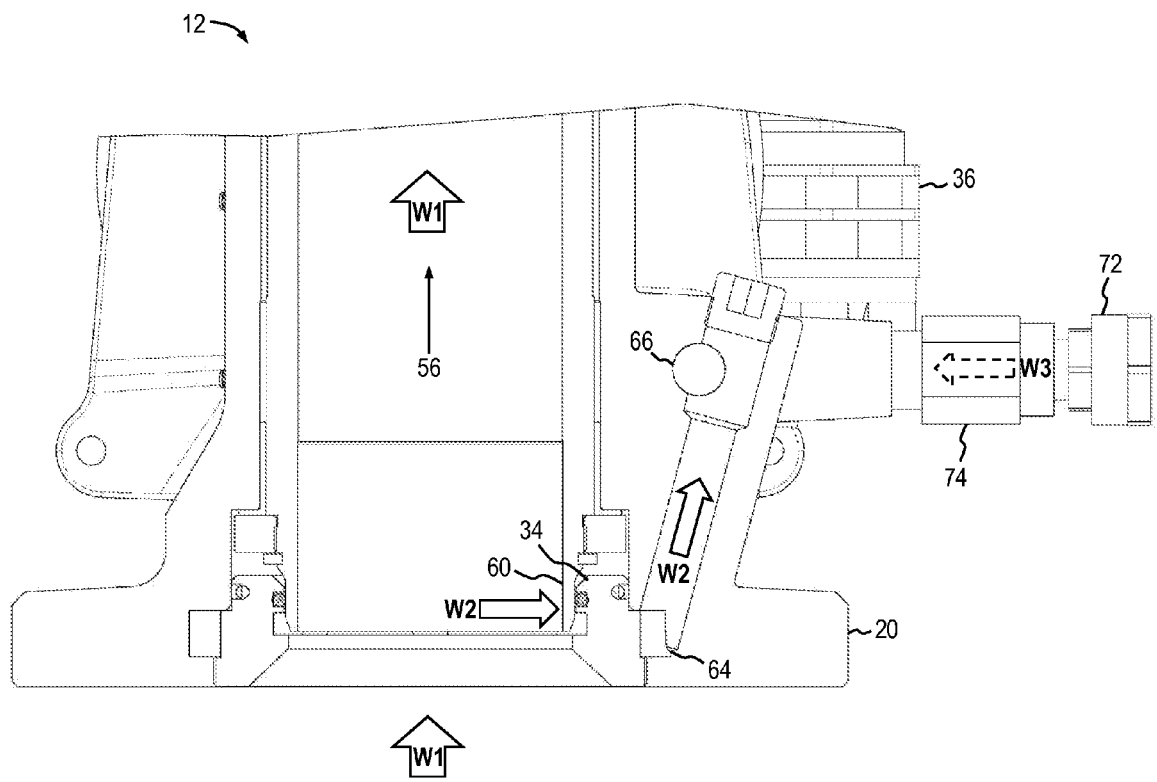
Figure 9:
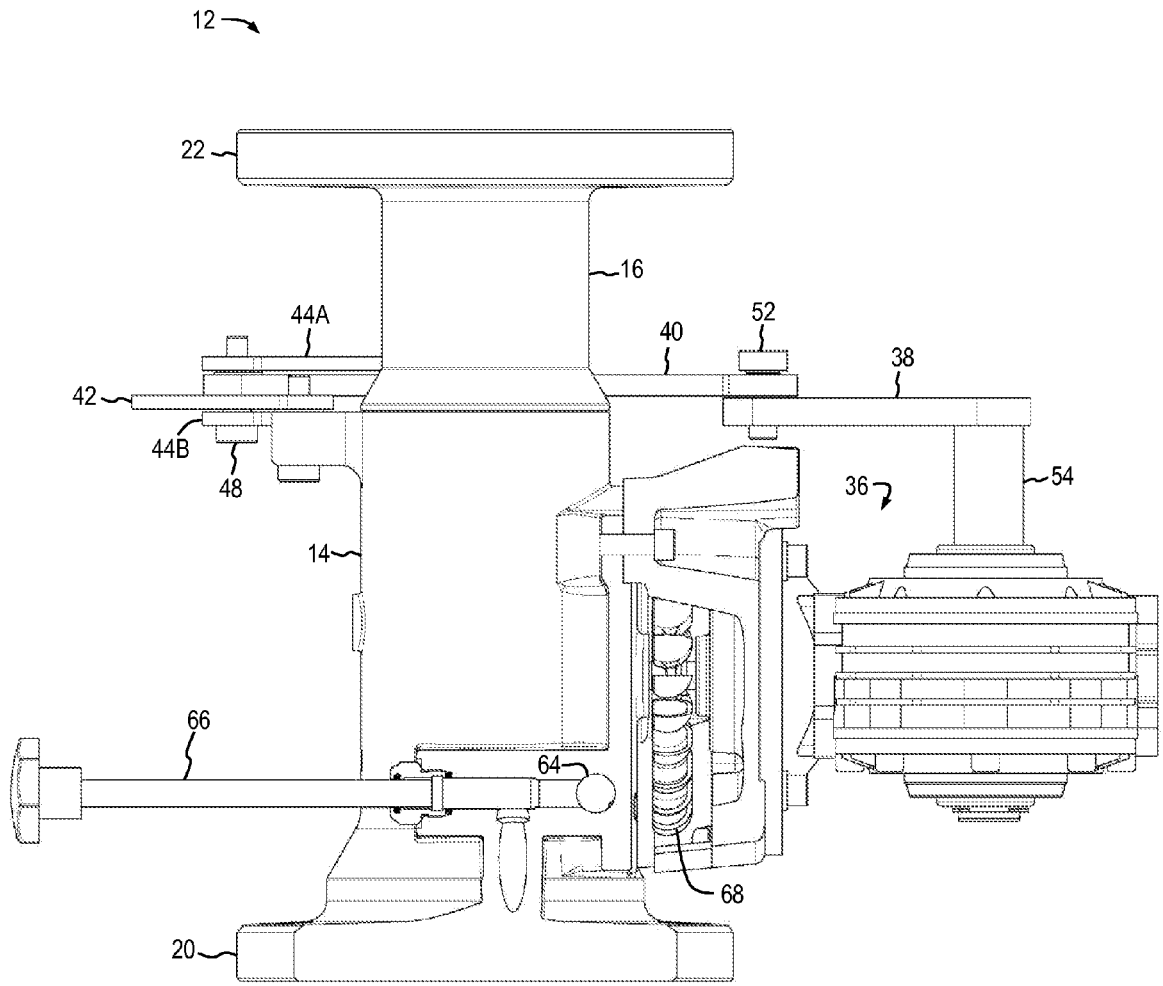

With reference now to FIGS. 7, 8 and 9, water flow W2, after passing through seam 58, moves through a water jet passage 62, around an annulus 64 between plug 34 and stationary portion 14, and then flows toward a needle valve 66. Needle valve 66, shown further in FIG. 9, is adjustable to control a pressure drop of the water flow W2, which in turn regulates the speed of a water wheel 68. Needle valve 66 thus ultimately controls the oscillation speed of rotatable portion 16 by controlling the flow of water impinging upon water wheel 68. As the flow of W2 increases, rotatable portion 16 will rotate through its oscillatory pattern at a faster "sweep rate." Conversely, as the flow of W2 is decreased by needle valve 66, rotatable portion 16 will rotate through its oscillatory pattern at a slower sweep rate.

Figure 10:
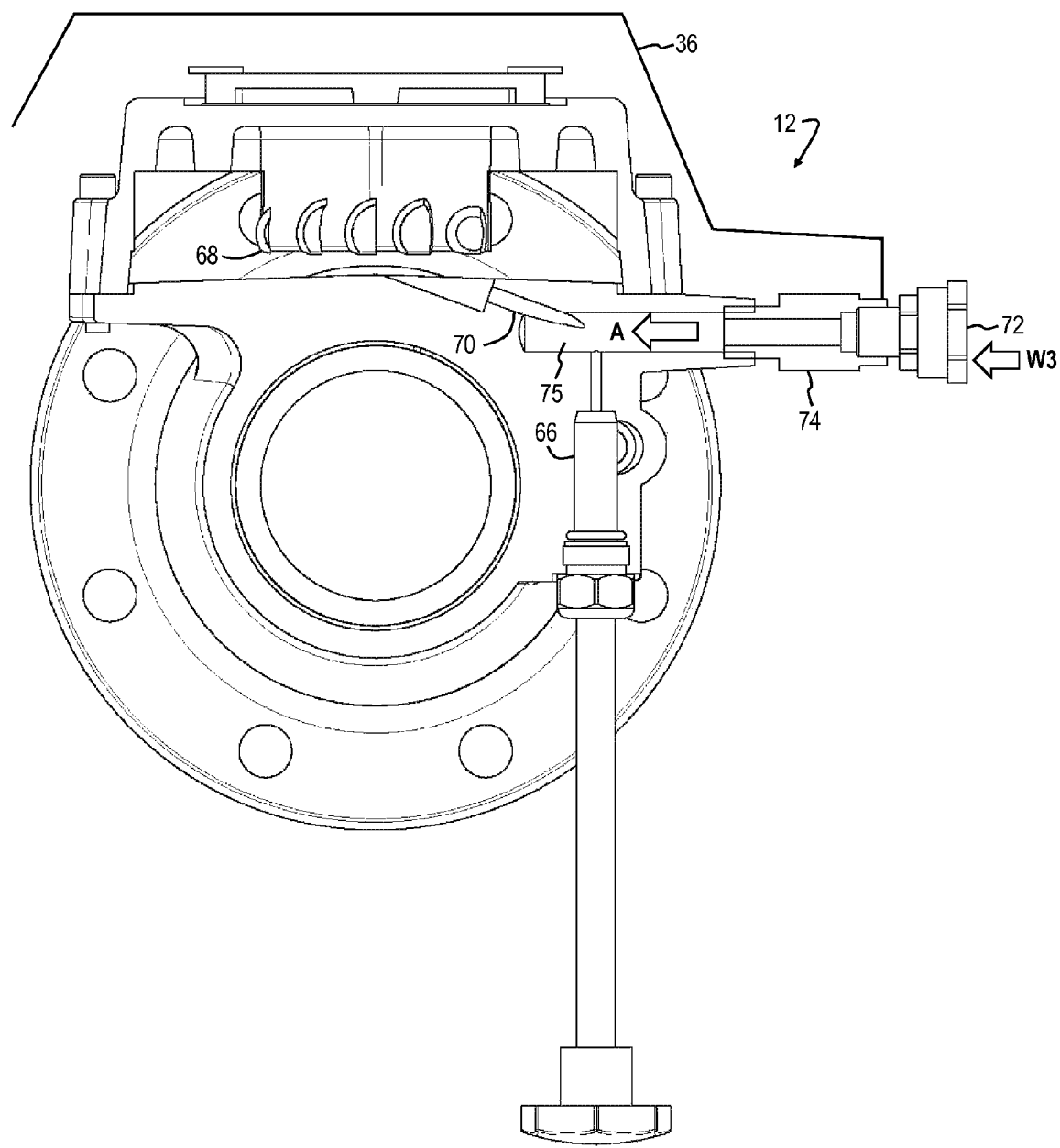

Referring to FIG. 10, after leaving needle valve 66 the water flow arrives at an orifice 70 which supplies the flowing water W2 to water wheel 68. In one embodiment of the present invention water turbine 36 further includes a hose port 72 for testing rotatable flange assembly 12 in the absence of water flow W1 and W2. Hose port 72 may further include a check valve 74 which allows a water flow W3 supplied through a channel 75 of hose port 72 to flow only in the direction of arrow "A." To test the operation of rotatable flange assembly 12 a user attaches a hose (not shown) to port 72 and supplies water flow W3 through the hose, urging this water flow through check valve 74 and channel 75. The flowing water W3 impinges upon water wheel 68, causing rotatable portion 16 to oscillate.

Figure 11:
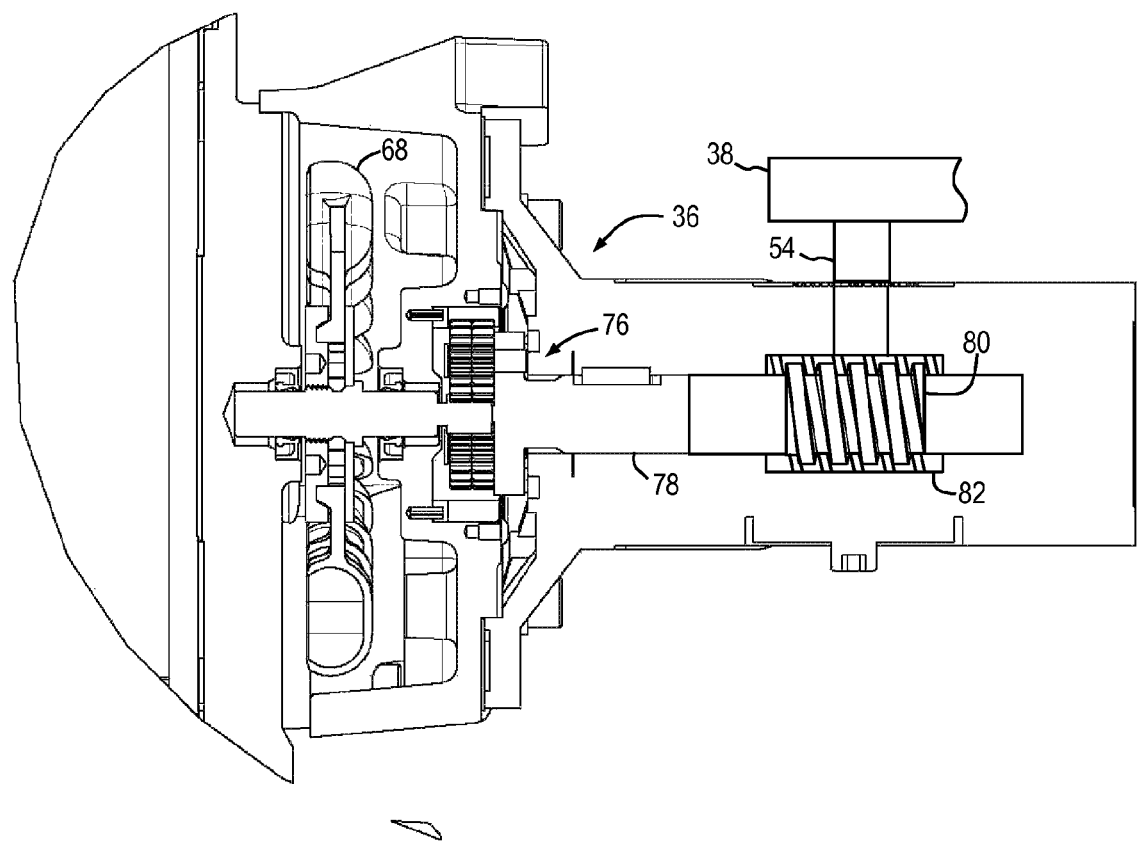

FIG. 11 shows further details of water turbine 36. Flowing water impinging upon water wheel 68 causes the water wheel to rotate at a relatively high speed and with a relatively low torque. The rotary motion of water wheel 68 is coupled to an input of a transmission 76, which converts the high-speed-low torque rotary motion to a rotary motion having a lower speed and with a higher torque. Any suitable topology for transmission 76 may be utilized including, but not limited to, spur gears, planetary gears, helical gears and worm/worm wheel gears. An output 78 of transmission 76 such as, but not limited to, a worm gear 80, is coupled to output shaft 54 in any suitable manner such as, but not limited to, a worm wheel 82 joined to the output shaft. Worm gear set 80, 82 further reduces the speed of the rotary motion while further increasing torque.

It should be noted that, although output shaft 54 (and thus output crank 38 rotate in a counter-clockwise direction in FIGS. 5A-5I, turbine 36 may be configured to rotate instead in a clockwise direction within the scope of the invention. This may be accomplished in a number ways including, but not limited to, configuring water wheel 68 and/or transmission 76 to achieve the desired motion.

Figure 12:
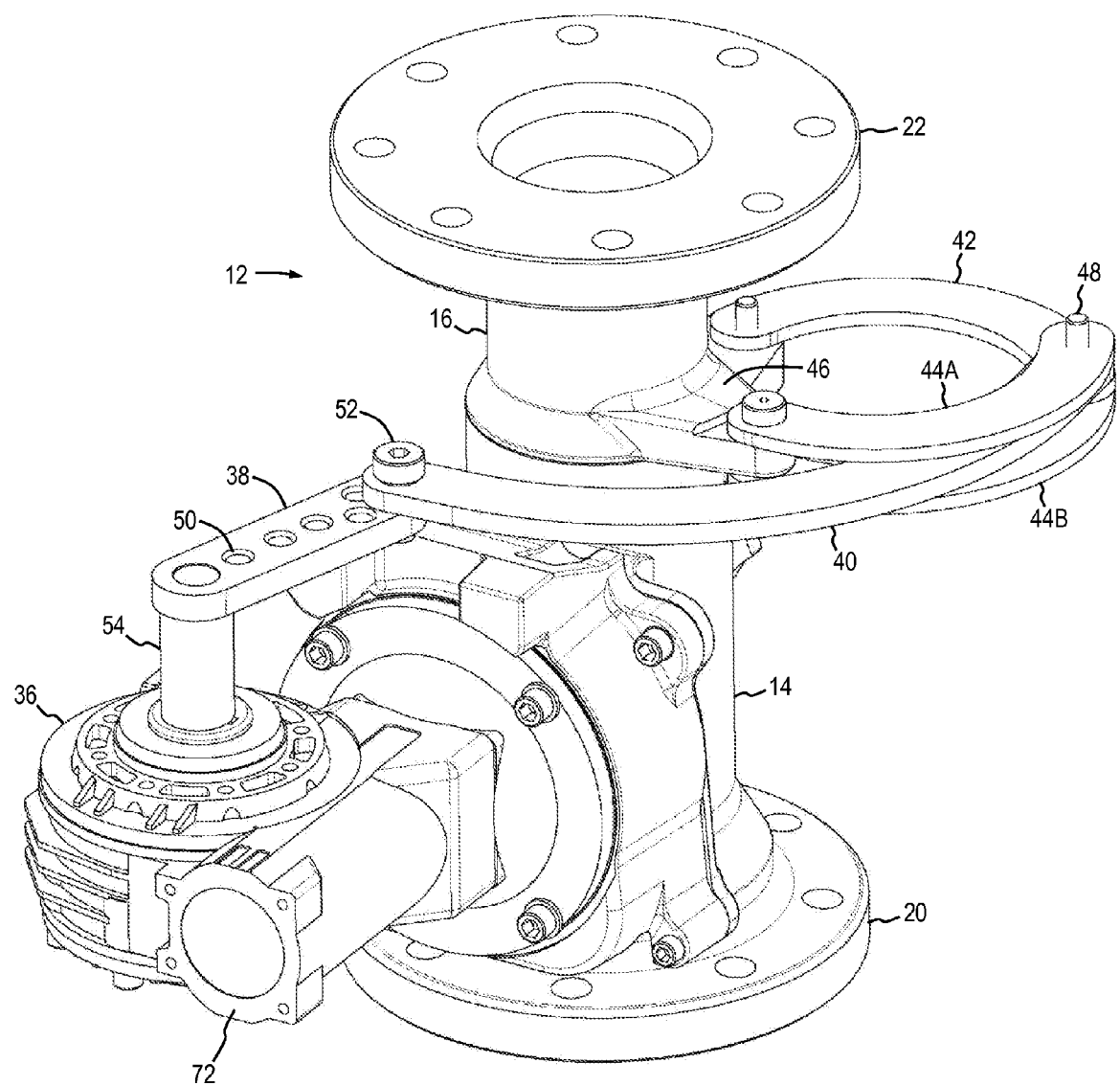
Figure 13:
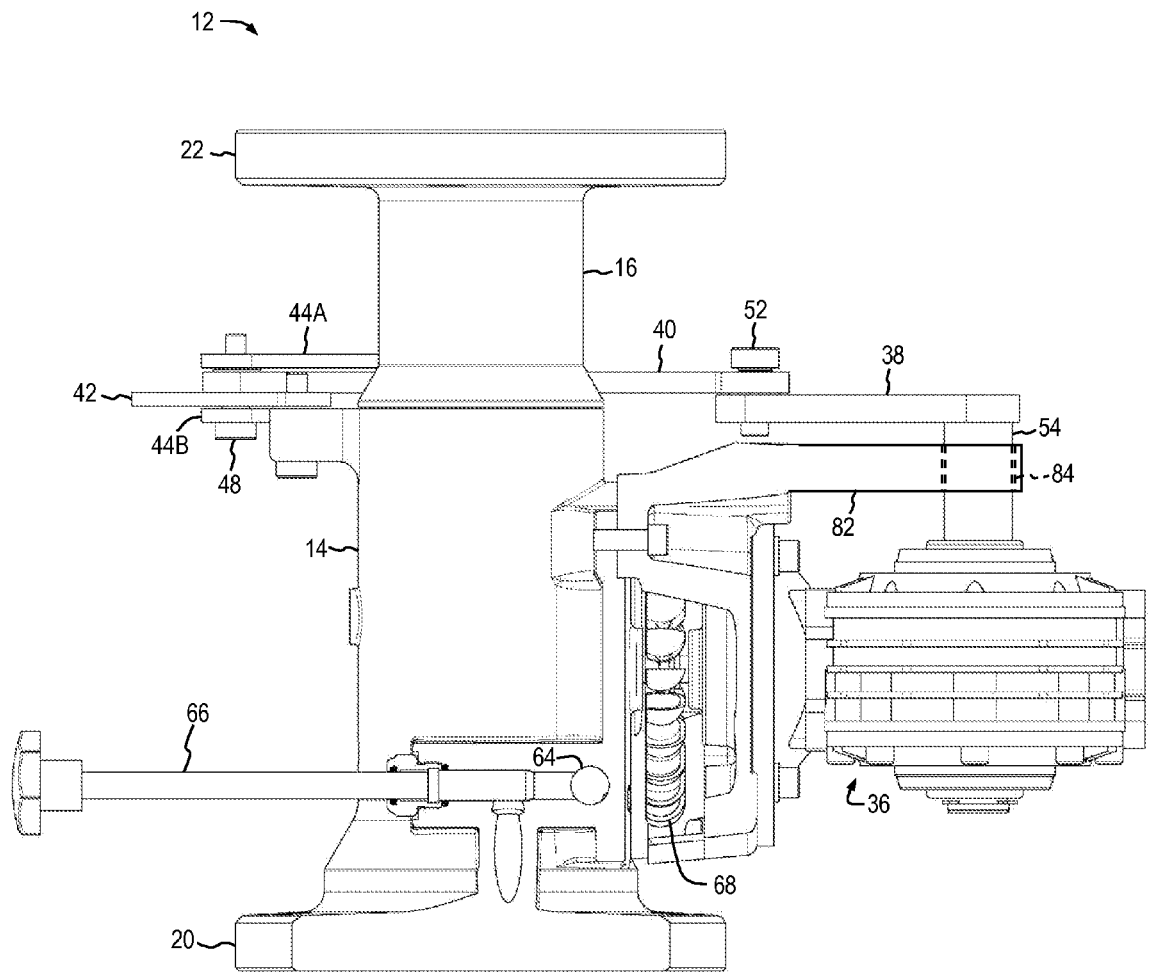

With reference to FIG. 12, output shaft 54 turns output crank 38, which applies a reaction force to first linkage 40. Output shaft 54 may optionally be supported to deter bending forces in any suitable manner, such as a stationary tube surrounding the output shaft and coupled to the turbine 36. Alternatively, with reference to FIG. 13, a brace 84 may be extended generally horizontally from stationary portion 14 or a housing portion of turbine 36, output shaft 54 extending through an appropriately-sized opening in the brace. A bushing 86 may be interposed between the brace 84 and output shaft 54 to reduce wear on the brace due to rotary motion of the output shaft.

While this invention has been shown and described with respect to a detailed embodiment thereof, it will be understood by those skilled in the art that changes in form and detail thereof may be made without departing from the scope of the claims of the invention.

What is claimed is:

1. A rotatable apparatus for a fluid-directing device, comprising:
a flange assembly having a stationary portion, a rotatable portion disposed in the stationary portion, and a duct extending through the stationary and rotatable portions, the duct being adapted to convey fluid flowing therethrough, the fluid entering the duct through the stationary portion and exiting the duct through the rotatable portion;
a water-driven turbine having a water jet passage, a rotatable water wheel and a rotatable output shaft coupled to the water wheel, the water jet passage being in communication with the duct and receiving a drive portion of the flowing fluid, the drive portion being directed at the water wheel and causing the water wheel to rotate, the rotation of the water wheel causing the output shaft to rotate;

an output crank coupled to the output shaft;

a first linkage having a first end and a second, opposing end, the first end being rotatably coupled to the output crank;

a rocker arm having a first end and a second, opposing end; and a second linkage, the second linkage comprising a first linkage member and a second linkage member, the first and second linkage members each having a first and a second opposing end, the second end of the first linkage being rotatably coupled to both the first end of the rocker arm and the first ends of the first and second linkage members, the second end of the rocker arm being rotatably attached to the stationary portion, the second ends of the first and second linkage members being rotatably coupled to the rotatable portion, the first linkage being movable in a first oscillatory pattern, and a major portion of the first and second linkage members overlapping the first linkage for at least a portion of the first oscillatory pattern, the rotatable portion being movable from a first sweep end to a second sweep end in a determinable second oscillatory pattern, and a sweep angle formed between the first sweep end and the second sweep end ranging to about 165 degrees.

2. The rotatable apparatus of claim 1 wherein the stationary portion further includes a mounting ring configured to both attach the rotatable apparatus to a mounting surface and to couple the rotatable apparatus to a fluid supply.

3. The rotatable apparatus of claim 1 wherein the rotatable portion further includes an output flange configured to receive fluid-directing devices.

4. The rotatable apparatus of claim 3 wherein the fluid-directing device is a nozzle.

5. The rotatable apparatus of claim 1, further comprising at least one generally cylindrical bearing intermediate the stationary portion and the rotatable portion, the bearing being a hollow piece having a circular sidewall, open ends, and a retaining lip at one end.

6. The rotatable apparatus of claim 5 wherein the bearing is a unitary piece.

7. The rotatable apparatus of claim 5 wherein the bearing is made from a polymer plastic.

8. The rotatable apparatus of claim 7 wherein the bearing is made from ultra high molecular weight polyethylene.

9. The rotatable apparatus of claim 1, further including at least one seal disposed between the stationary portion and the rotatable portion of the flange assembly.

10. The rotatable apparatus of claim 1 wherein the first and second linkage members are spaced apart from and generally parallel to one another, forming a clevis.

11. The rotatable apparatus of claim 1 wherein the output crank further includes a plurality of apertures, the first end of the first linkage being rotatably coupled to a select aperture, the oscillation angle of the rotatable portion depending upon the distance of the select aperture from the output shaft.

12. The rotatable apparatus of claim 1, further comprising a plug coupled to the stationary portion, the plug and a lower end of the rotatable portion forming a seam to filter the drive portion of the flowing fluid.

13. The rotatable apparatus of claim 1, further including a needle valve to control the amount of flow of the drive portion, the speed at which the rotatable portion oscillates being generally proportional to the amount of flow of the drive portion.

14. The rotatable apparatus of claim 1, further including a hose port coupled to the turbine.

15. The rotatable apparatus of claim 14, further comprising a check valve intermediate the hose port and the turbine.

16. The rotatable apparatus of claim 1, further including a transmission intermediate the water wheel and the output shaft.

17. The rotatable apparatus of claim 1, further including a brace extending between the output shaft and a housing of the turbine, the output shaft extending through the brace.

18. The rotatable apparatus of claim 17, further including a bushing intermediate the output shaft and the brace.

19. A rotatable apparatus for a fluid-directing device, comprising:

a flange assembly having a stationary portion, a rotatable portion disposed in the stationary portion, and a duct extending through the stationary and rotatable portions, the duct being adapted to convey fluid flowing therethrough, the fluid entering the duct through the stationary portion and exiting the duct through the rotatable portion;

at least one generally cylindrical bearing intermediate the stationary portion and the rotatable portion, the bearing being a hollow piece having a circular sidewall, open ends, and a retaining lip at one end;

a water-driven turbine having a water jet passage, a rotatable water wheel and a rotatable output shaft coupled to the water wheel, the water jet passage being in communication with the duct and receiving a drive portion of the flowing fluid, the drive portion being directed at the water wheel and causing the water wheel to rotate, the rotation of the water wheel causing the output shaft to rotate;

an output crank coupled to the output shaft, the output crank having a plurality of apertures;

a first linkage having a first end and a second, opposing end, the first end being rotatably coupled to a select aperture of the output crank;

a rocker arm having a first end and a second, opposing end; and a second linkage, the second linkage comprising a first linkage member and a second linkage member, the first and second linkage members each having a first and a second opposing end, the first and second linkage members being spaced apart from and generally parallel to one another, forming a clevis, the second end of the first linkage being rotatably coupled to both the first end of the rocker arm and the first ends of the first and second linkage members, the second end of the rocker arm being rotatably attached to the stationary portion, the second ends of the first and second linkage members being rotatably coupled to the rotatable portion, the first linkage being movable in a first oscillatory pattern, and a major portion of the first and second linkage members overlapping the first linkage for at least a portion of the first oscillatory pattern, the rotatable portion being movable from a first sweep end to a second sweep end in a determinable second oscillatory pattern, and a sweep angle formed between the first sweep end and the second sweep end ranging to about 165 degrees, the oscillation angle of the rotatable portion depending upon the distance of the select aperture from the output shaft.

20. A method for distributing fluid, comprising the steps of:
providing a flange assembly having a stationary portion;
disposing a rotatable portion disposed in the stationary portion, forming a duct extending through the stationary and rotatable portions, the duct being adapted to convey fluid flowing therethrough, the fluid entering the duct through the stationary portion and exiting the duct through the rotatable portion;
placing a water-driven turbine in communication with the duct, an output shaft of the turbine being rotatable by fluid flowing in the duct;
coupling an output crank coupled to the output shaft;
providing a first linkage having a first end and a second, opposing end, the first end being rotatably coupled to the output crank;
providing a rocker arm having a first end and a second, opposing end; and
providing a second linkage, the second linkage comprising a first linkage member and a second linkage member, the linkage members each having a first and a second opposing end;
rotatably coupling the second end of the first linkage to both the first end of the rocker arm and the first ends of the linkage members;
rotatably attaching the second end of the rocker arm to the stationary portion; and
rotatably coupling the second ends of the linkage members to the rotatable portion,
the first linkage being movable in a first oscillatory pattern, and
a major portion of the first and second linkage members overlapping the first linkage for at least a portion of the first oscillatory pattern,
the rotatable portion being movable from a first sweep end to a second sweep end in a determinable second oscillatory pattern, and a sweep angle formed between the first sweep end and the second sweep end ranging to about 165 degrees.

21. The rotatable apparatus of claim 1 wherein the rocker arm has a curved shape extending from the first end to the second end thereof.

22. The rotatable apparatus of claim 21 wherein the second linkage has a curved shape extending from the first end to the second end thereof, and the rocker arm curved shape is configured in an opposite radius relative to the second linkage curved shape.

23. The rotatable apparatus of claim 1 wherein the second, opposing end of the second linkage is rotatably coupled at a first fastener to a tab of the rotatable portion and the second, opposing end of the first linkage is in turn rotatably coupled at a linking pin to both a first end of the rocker arm and the first end of the second linkage, the rotatable portion being configured with a predetermined length from a center of rotation to a centerline of the fastener and with a distance from the center of rotation to the centerline of the linking pin, whereby the distance to the linking pin is less than the length to the fastener when the rotatable portion is at the second sweep end of the second oscillatory pattern.

* * * * *